June 7, 1966  W. J. GOODWIN  3,254,877

DISC DISPERSER-MIXER

Filed Nov. 26, 1963  2 Sheets-Sheet 1

INVENTOR.
WILLIAM J. GOODWIN
BY
*Walter C. Kehm*
ATTORNEY

June 7, 1966 W. J. GOODWIN 3,254,877
DISC DISPERSER-MIXER

Filed Nov. 26, 1963 2 Sheets-Sheet 2

INVENTOR
WILLIAM J. GOODWIN
BY
ATTORNEY

United States Patent Office 3,254,877
Patented June 7, 1966

3,254,877
DISC DISPERSER-MIXER
William J. Goodwin, Millington, N.J., assignor to Union
Carbide Corporation, a corporation of New York
Filed Nov. 26, 1963, Ser. No. 325,964
16 Claims. (Cl. 259—8)

This invention relates to a disc disperser-mixer and more particularly to a high speed disc disperser-mixer for the mixing and dispersing of incompatible substances such as particulate solids in liquids including paint mixtures.

Production and handling of pigments usually results in the formation of clumps of particles or agglomerates. If these particulate materials are to be distributed effectively in a liquid medium, it is necessary to break down these agglomerates to individual particles and to prevent the reformation thereof.

The operation of particle reduction and distribution in a liquid medium is called dispersion and mixing. This dispersion may be suspensoid in nature, where solids are dispersed in a liquid medium or emulsoid, where the incompatible substances dispersed are immiscible liquids or there may be a combination thereof. Dispersion is achieved by shearing and breaking the agglomerates in a liquid medium and using the characteristics of the medium to keep the particles separated.

Many dispersion and mixing techniques now in use require a high concentration of particulate material, of from 20% by weight to 80%, depending upon the absorption ability of the surface of the particles to be dispersed, to provide a system having high shear. The mixing and dispersing equipment now available has a high horsepower requirement and consequent low efficiency, is complex and difficult to clean, requiring substantial periods of shut-down time. Nor is a large proportion of the equipment suitable for handling high volatile liquids due to loss through evaporation thereof. The conventional mixer and dispersion now in use does not make thixotropic mixtures directly but requires additives. There is, therefore, a need and a market for a mixing and dispersing device that has substantially none of these shortcomings.

Accordingly, it is an object of this invention to provide a high speed rotary disperser-mixer having a high impact-shear action that will produce good commercial dispersions with concentrations of particulate materials in liquids as low as .1% and as high as 80%.

It is another object of this invention to provide a high speed rotary disperser-mixer that is of simple construction, easily cleaned and has a low horsepower requirement.

It is also another object of this invention to provide a high speed rotary disperser-mixer that can handle highly volatile substances with no appreciable loss thereof.

It is still another object of this invention to provide a high speed rotary disperser-mixer that can produce thixotropic dispersions from substances having large pigment concentrations.

These and other objects are accomplished in the present invention which provides a mixing and dispersing apparatus of simple construction comprising a housing with a bottom reservoir therein, a drive shaft connected to rotating means therefor and longitudinally disposed within the housing, at least one disc mounted at the central axis thereof on said shaft, each disc having a clearance with the housing walls sufficient to allow the uncongested flow of dispersed materials within the said housing, at least one feed channel positioned to deliver input material to each disc near the axis thereof, so that said material is distributed in a thin film thereon for uniform dispersion thereby and a discharge channel affixed to said reservoir for removing the treated material from said reservoir.

The invention will become more apparent from the following detailed specification and the drawings, in which.

Figure 1:
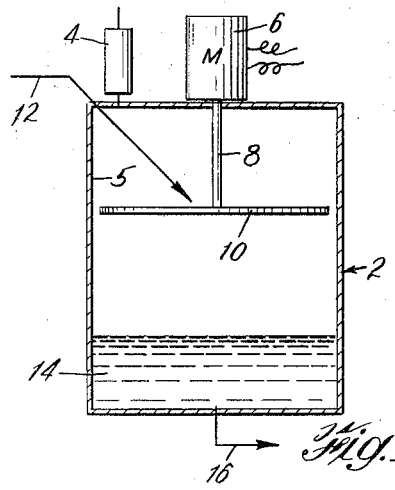
FIGURE 1 is a schematic representation of a disperser-mixer embodying the invention showing a simple inlet-outlet system and a dispersing disc.

Referring now to the drawings, the disperser-mixer embodying the invention, as illustrated in FIGURE 1, comprises a housing 2 with a condenser 4 affixed thereto. A motor 6 turns a drive-shaft 8 and a dispersing disc 10 mounted at the central axis thereon. Input material is delivered through a feed channel 12 on to the rotating dispersing disc 10 near the axis, whirled to the periphery thereof, undergoing shear and hurled against the walls 5 of the housing 2 undergoing further shear at impact. The material thus mixed and dispersed is then collected in a reservoir 14 and released through a discharge channel 16.

Figure 2:
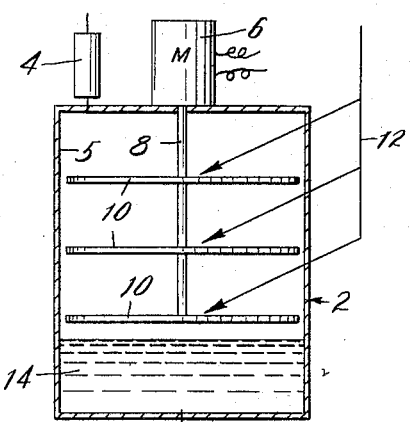
FIGURE 2 is a schematic drawing of another embodiment of the present invention showing a plurality of dispersing discs with an inlet feed channel to each disc and a discharge channel.

The disperser-mixer may have a series of dispersing discs 10 mounted at the central axes thereof on a drive-shaft 8 with an input channel 12, delivering materials to each disc as in the modification of the invention illustrated by FIGURE 2. A mixing disc 11 may also be mounted on the drive shaft 8 as in the embodiments illustrated in FIGURES 3, 4 and 5.

Figure 4:
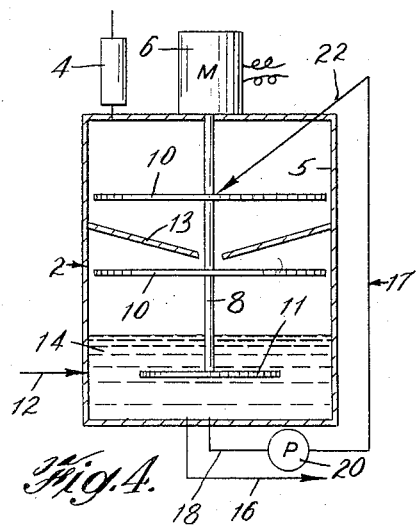
FIGURE 4 is a schematic drawing of a disperser-mixer embodying the invention showing two dispersing discs with a baffle placed between, a mixing disc and a modification of the inlet-outlet system.
Figure 6:
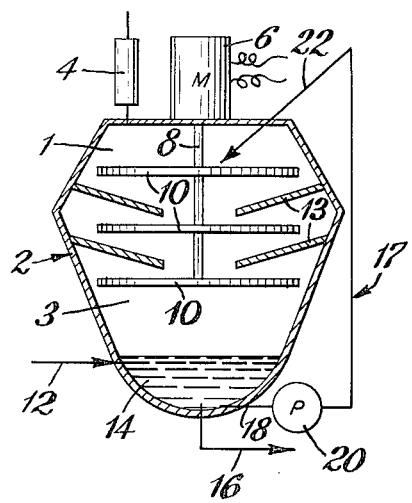
FIGURE 6 is a schematic drawing of a disperser-mixer embodying the invention illustrating a plurality of dispersing discs with baffles placed between, the discs and baffles being mounted in a housing similar to that of FIGURE 5.

Another embodiment of the disperser-mixer has baffles 13 which channel the dispersed material from the higher dispersing disc 10 to that below as shown in FIGURES 4 and 6.

Figure 5:
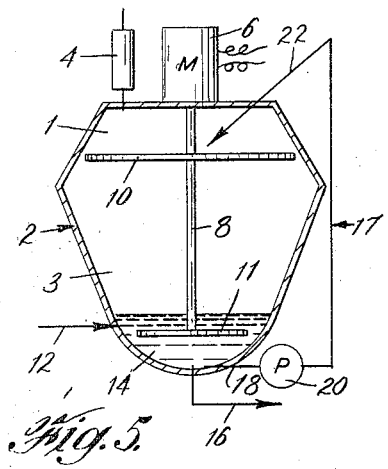
FIGURE 5 is a schematic drawing of a disperser-mixer embodying the invention illustrating a specific housing shape.

A preferable housing shape is shown, for example, in FIGURE 5. The housing 2 comprises a frusto-conical shaped upper portion 1 integral with a lower portion 3, an inverted bell-shaped reservoir. Thus the wall of the upper portion 1 and the wall of the lower portion 3 of the housing 2 serve to deflect toward the reservoir 14, the materials hurled off the revolving dispersing disc 10 to impact therewith and provide still further shear and dispersion of the particulate materials. The oblique disposal of the wall of the upper portion 1 further serves to minimize build-up of the dispersion at the point of impact.

Figure 3:
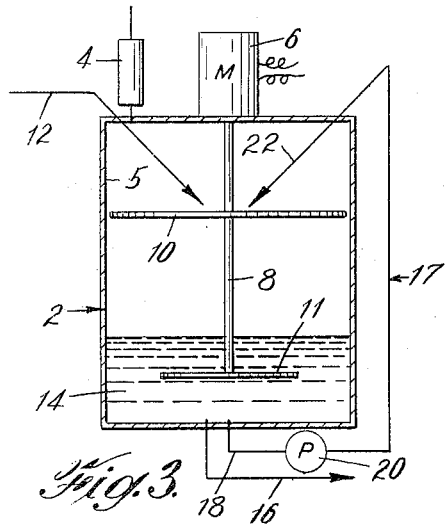
FIGURE 3 is a schematic drawing of a disperser-mixer embodying the invention showing a dispersing disc, a mixing disc, an inlet feed channel, a circulating system and a discharge channel.

The materials or incompatible substances may be introduced to the disperser-mixer embodying the invention onto each dispersing disc 10 through inlet channel 12 as illustrated in FIGURES 1, 2 and 3, or the inlet flow of materials may be directed to the topmost disc 10 where baffles 13 as those of the embodiment shown in FIG- URES 4 and 6 may be provided. The input materials may also be introduced at the reservoir as in the embodiments of the invention illustrated in FIGURES 4, 5 and 6.

The introduced materials may be cycled from reservoir 14 to dispersing disc 10 by means of circulating channel 17 comprising an outlet 18, a pump 20 and an inlet 22 as in the embodiments shown in FIGURES 3, 4, 5 and 6. The mixing disc 11 shown in these figures serves to mix and exert further shear on the materials collected in the reservoir 14.

Figure 5A:
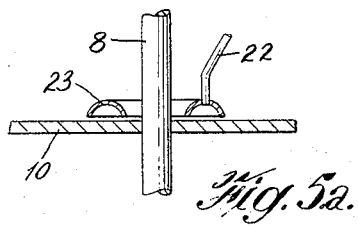
FIGURE 5A is a partial sectional detail of FIGURE 5 showing the dispersing disc mounted on a drive shaft with an inlet channel comprising an annulus.

The inlet 22, for example, of the circulating channel 17 of the embodiment of the disperser-mixer shown in FIGURE 5 may terminate in an annulus 23 opening downward on the dispersing disc 10 as shown in the detail, FIGURE 5A.

The input materials may be subjected to a cursory mixing before the introduction to the dispersion-mixer embodying the invention or these materials may be separately introduced at the dispersing disc 10 or at the reservoir 14.

The disperser-mixer embodying this invention may readily be adapted for the dispersion of solid particles in liquids or liquids in other incompatible liquids. It can be heated to liquefy materials normally solid at room temperature. It will produce commercial dispersions in a wide range of concentrations from .1% to 80%.

The disperser-mixer embodying this invention is particularly suited to the dispersion and mixing of plastics and paints. At large pigment concentrations, the resulting dispersion is generally thixotropic without additives and the pigment remains in suspension for periods exceeding 2 years. For example, a dispersion of 40% titanium dioxide in mineral oil made with the disc disperser-mixer showed no apparent settle and only a minor amount of separation after a two year storage period.

The mixing and dispersing apparatus may take a variety of forms but the basic principle of operation remains substantially the same. The materials are introduced near the axis of a high speed rotating disc 10 and hurled violently against the walls 5 of the vessel. The impact and resulting shear serve to break down and disperse the materials.

An important feature of the disperser-mixer is that it runs "unflooded." That is, the feed materials are introduced sparingly to the dispersions disc at a predetermined rate so that all of it is treated thereby. For the introduced materials form a film radially covering the rotating disc, droplets form at the periphery thereof, and each droplet experiences hurling into space, impingement on the adjacent walls of the housing and shear. Other mixing and dispersing devices, which may, at first inspection, seem related, do, in fact, run "flooded," so that the rotor and stator of the particular vessel are inundated by the materials introduced. The result is, not all the materials reach the rotor-disperser but are detoured around it, while the inner layer of introduced materials adjacent to the rotor experiences shear thereto but is cushioned from impact with the adjacent stator by the excess materials that are detoured. Thus, thoroughness of dispersion and uniformity of particle size are more closely achieved in the "unflooded" rather than the "flooded" operation.

There may be one disc or a plurality thereof. Each disc preferably is circular in shape for uniform treatment of the materials dispersed. However, other disc shapes may be used such as that of a regular polygon or other axially symmetrical disc shapes including those with slots or curves cut therein and the like. Each disc should rotate about a central axis. Moreover, where a mixing component is provided, it may take a form other than a disc and may comprise any conventional agitation system such as a propeller, a cross-piece and the like. These mixing means are encompassed by the term "mixing disc" as used herein. In the disperser-mixer embodying this invention a circular dispersing disc and a circular mixing disc, mounted on a common drive shaft at their central axes are preferred.

The rotating disc and stationary housing comprise the familiar rotor-stator combination. This arrangement is preferred. However, the housing or that part thereof adjacent to the dispersing discs may be rotated in the opposite direction greatly increasing the shear at impact.

The housing of the disperser-mixer may be of any conventional form such as cylindrical, spherical, frusto-conical, ellipsoidal or a combination thereof. The shape preferable for the disperser-mixer embodying this invention comprises a frusto-conical upper portion 1, positioned so that the smaller diameter is at the top thereof and a lower portion comprising an inverted bell-shaped reservoir 3 as illustrated in FIGURE 5. The dispersing disc 10 in this embodiment is mounted on the drive shaft 8 within the frusto-conical upper portion 1 and has a clearance with the housing walls sufficient to allow the uncongested flow of the dispersed materials and the mixing disc 11 is mounted on the drive shaft 8 below, in the reservoir 14. Thus the means are provided whereby the materials hurled against the walls from the rotating dispersing disc and deflected toward the reservoir are subjected to further mixing and the dispersion is upheld.

The materials may be introduced to the disperser-mixer at the top and at the underside of one or more dispersing discs near the axes thereof and discharged at the reservoir thereof. Where there are a plurality of dispersing discs, each disc may be separately fed in a parallel system by one or more chanels or the topmost dispersing disc only may be fed in a series system, where means such as intermediate baffles are provided to channel the flow of materials from the higher dispersing disc to that below.

The disperser-mixer embodying the invention may have a circulatory channel as a means of recycling the introduced materials for further dispersion. The materials, or incompatible substances, may be introduced to the dispersing discs as described above or fed into the disperser-mixer at the reservoir. The materials may be circulated from the reservoir to each dispersing disc above or to the topmost dispersing disc. The treated materials may be circulated from the reservoir to each dispersing disc above or to the topmost dispersing disc. The treated material may then be recovered by means of at least one discharge channel. Thus, the disperser-mixer embodying the invention may serve in a batch or continuous operation.

The preferred embodiment of the disperser-mixer of this invention has a feed channel situated at the reservoir, below the single dispersing disc, a circulating channel from the reservoir onto the dispersing disc above and a discharge channel at the reservoir.

The means of depositing materials at a dispersing disc may comprise a conventional conduit or a plurality thereof, positioned to dischare the materials on the top of the disc near its axis, at the underside of the disc near the axis or both. A preferred means of depositing the material comprises a channel or conduit terminating in an annulus concentrically disposed about the drive shaft and opening toward the disc mounted thereto. Each dispersing disc may be fed from both sides in this manner. The annulus, besides providing uniform distribution of the deposited materials, occasions vigorous shear and homogenization of these materials at the disc-annulus interface.

The disperser-mixer embodying the invention has a low horsepower requirement. This is particularly true of the preferred embodiment of the disperser-mixer illustrated in FIGURE 5 and herein described, because of its simplicity. For example, an 8 inch dispersing disc requires $\frac{1}{40}$ horsepower to develop 3000 r.p.m. which can disperse 7.5 gallons of paint per hour.

The disperser-mixer embodying the invention is portable, easy to clean and requires a miimum shut-down time.

The condenser affixed to the housing enables the disperser-mixer to handle highly volatile liquids with no material loss or change in composition. However, the condenser though preferred, is not critical to the invention and may be dispensed with where the liquids treated have low volatility or a vent may be substituted therefor.

What is claimed is:

1. A mixing and dispersing apparatus comprising a housing having a bottom reservoir therein, a drive shaft connected to rotating means therefor and longitudinally disposed within the housing, an imperforate dispersing disc mounted at the central axis thereof on said shaft, a mixing disc mounted at the central axis thereof on said shaft below said dispersing disc and situated in said bottom reservoir, said mixing disc being substantially smaller in size than said dispersing disc, at least one feed channel positoned to deliver input material to said dispersing disc near the axis thereof, and a discharge channel affixed to said reservoir for removing the treated material from said reservoir.

2. The mixing and dispersing apparatus described in claim 1 comprising a plurality of said dispersing discs mounted at the central axes thereof, one above the other, on said drive shaft within the housing, at least one feed channel positioned to deliver the input material to the topmost of said dispersing discs near the axis thereof, a funnel shaped baffle anchored at the housing walls between each pair of said dispersing discs, said baffle sloping downward and terminating in an annular aperture, said aperture providing sufficient clearance for said shaft and the uncongested flow of the treated material.

3. A mixing and dispersing apparatus comprising a housing with a bottom reservoir therein, a drive shaft connected to rotating means therefor and longitudinally disposed within the housing, an imperforate dispersing disc mounted at the central axis thereof on said shaft, a mixing disc mounted at the central axis thereof on said shaft below said dispersing disc and situated in said bottom reservoir, said mixing disc being substantially smaller in size than said dispersing disc, at least one feed channel situated at said reservoir, a circulating channel comprising an outlet located at said reservoir, means to impel the circulating material through said channel, and at least one inlet positioned to discharge the circulated material to said dispersing disc, near the axis thereof, and a discharge channel affixed to said reservoir for removing the treated material from said reservoir.

4. The mixing and dispersing apparatus described in claim 3 comprising a plurality of said dispersing discs mounted at the central axes thereof, one above the other, on said drive shaft within the housing, a circulating channel having at least one inlet positioned to deliver the input material to the topmost dispersing disc, a funnel shaped baffle anchored at the housing walls between each pair of said dispersing discs, said baffle sloping downward and terminating in an annular aperture, said aperture providing sufficient clearance for said shaft and the uncongested flow of the treated material.

5. A mixing and dispersing apparatus comprising a housing having a frustro-conical shaped upper portion positioned so that the smaller diameter of said portion is at the top thereof, a bottom reservoir integral with said upper portion, a condenser affixed to said housing, a drive shaft connected to rotating means therefor, said shaft being longitudinally disposed within the housing, a plurality of imperforate discs mounted at the central axis thereof on said shaft, at least one of said discs positioned within said frustro-conical portion so that the material dispersed by said disc is deflected by the housing walls toward said reservoir, at least one feed channel situated at said reservoir, a circulating channel comprising an outlet located at said reservoir, means to impel the circulating material through said channel, and at least one inlet positioned to discharge the circulated material to at least one of said discs near the axis thereof and a discharge channel affixed to said reservoir for removing the treated material from said reservoir.

6. The mixing and dispersing apparatus described in claim 5, comprising a plurality of dispersing discs mounted at the central axes thereof, one above the other, on said drive shaft within the housing, a circulating channel having at least one inlet positioned to deliver the input material to the topmost dispersing disc, a funnel shaped baffle anchored at the housing walls between each pair of discs, said baffle sloping downward and terminating in an annular aperture, said aperture providing sufficient clearance for said shaft and the uncongested flow of the treated material.

7. The mixing and dispersing apparatus described in claim 5, comprising at least one dispersing disc mounted at the central axis thereof on said drive shaft within the housing, and at least one mixing disc mounted at the central axis thereof on said shaft, below the dispersing disc and situated in the bottom reservoir of said housing.

8. The mixing and dispersing apparatus described in claim 7, having a housing comprising a frusto-conical shaped upper portion positioned so that the smaller diameter is at the top thereof, and a lower portion comprising an inverted bell-shaped reservoir.

9. The mixing and dispersing apparatus described in claim 8, having a circulating channel comprising at least one inlet and an annulus affixed to each inlet, said annulus being concentrically disposed about said drive shaft within the housing and opening toward said dispersing disc mounted on said drive shaft.

10. The mixing and dispersing apparatus described in claim 8, having a circulating channel comprising a plurality of inlets terminating in annuli, said annuli being concentrically disposed about said drive shaft within the housing and opening toward both faces of said dispersing disc mounted on said drive shaft.

11. The mixing and dispersing apparatus described in claim 5, comprising a plurality of dispersing discs mounted at the central axes thereof, one above the other, on said drive shaft within the housing, a circulating channel having at least one inlet positioned to deliver the input material to the topmost dispersing disc, a funnel shaped baffle anchored at the housing walls between each pair of dispersing discs, said baffle sloping downward and terminating in an annular aperture, said aperture providing sufficient clearance for said shaft and the uncongested flow of the treated material, and at least one mixing disc mounted at the central axis thereof on said shaft, below the dispersing disc and situated in the bottom reservoir of said housing.

12. The mixing and dispersing apparatus described in claim 1 having a plurality of said dispersing discs mounted on said shaft one above the other and at least one feed channel positioned to deliver input material to each of said dispersing discs near the axes thereof.

13. The mixing and dispersing apparatus described in claim 3 wherein a plurality of discs are mounted on said shaft and said circulating channel has a plurality of inlets, at least one of which is positioned to discharge the circulated material to each of said discs near the axes thereof.

14. The mixing and dispersing apparatus described in claim 5 wherein a plurality of discs are mounted on said shaft within said frusto-conical portion and said circulating channel has a plurality of inlets, at least one of which is positioned to discharge the circulated material to each of said discs near the axes thereof.

15. Method for mixing and dispersing incompatible substances comprising introducing said substances into the lower portion of a housing, mixing said substances therein, circulating at least once said substances from said lower portion to at least one high speed revolving disc near the axis thereof, said disc being situated in the upper portion of said housing, subjecting said substances to the centrifugal forces of said revolving disc, causing the substances to be distributed in a thin film over the surface thereof to effect shearing of said film as said substances traverse said revolving disc from the inner portion to the periphery thereof, hurling said substances against the walls of the housing adjacent thereto further shearing said substances at impact with said walls to break up and reduce the size of the agglomerates thereby collecting the substances under the influence of gravity in said lower portion and recovering the mixed and dispersed products from said lower portion.

16. A mixing and dispersing apparatus comprising a housing with a bottom reservoir therein, a drive shaft connected to rotating means therefor and longitudinally disposed within the housing, a plurality of imperforate discs mounted at the central axis thereof, one above the other, on said shaft within the housing, at least one feed channel situated at said reservoir, a circulating channel comprising an outlet located at said reservoir, means to impel the circulating material through said channel and at least one inlet positioned to deliver the input material to the topmost disc near the axis thereof, a funnel shaped baffle anchored at the housing walls between each pair of said discs and a discharge channel affixed to said reservoir for removing the treated material from said reservoir.

References Cited by the Examiner
UNITED STATES PATENTS

| | | | |
|---|---|---|---|
| 1,816,453 | 7/1931 | Willard | 259—8 |
| 1,932,931 | 10/1933 | Greer et al. | 259—8 |
| 2,183,763 | 12/1939 | Brown | 259—24 |

FOREIGN PATENTS

| | | |
|---|---|---|
| 838,593 | 5/1952 | Germany. |
| 49,705 | 12/1940 | Netherlands. |

WALTER A. SCHEEL, *Primary Examiner.*

CHARLES A. WILLMUTH, *Examiner.*

R. W. JENKINS, *Assistant Examiner.*